Figure 1:
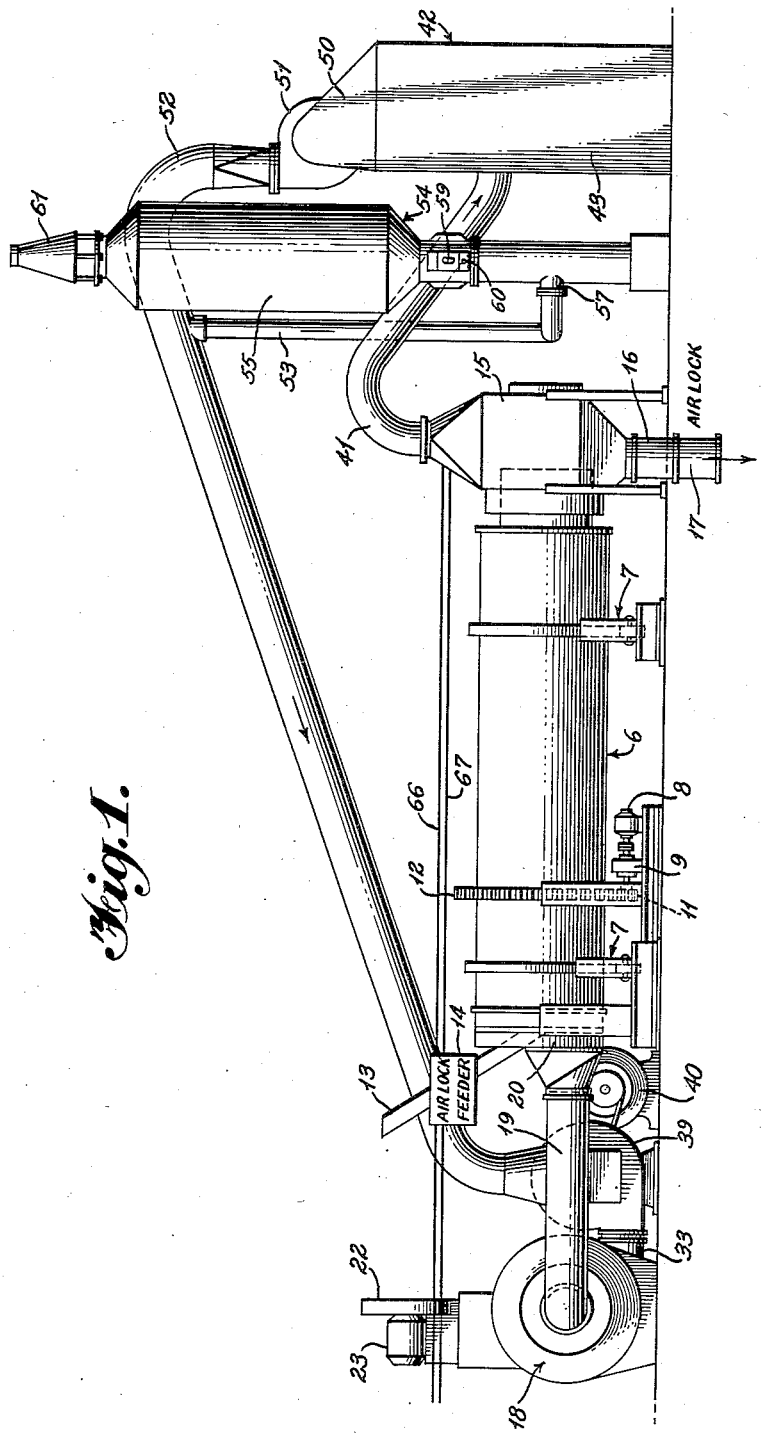

June 3, 1958  H. W. DAVIS  2,836,901
METHOD FOR DRYING METAL SCRAP
Filed May 26, 1954  3 Sheets-Sheet 1

June 3, 1958 H. W. DAVIS 2,836,901
METHOD FOR DRYING METAL SCRAP
Filed May 26, 1954 3 Sheets-Sheet 3

United States Patent Office 2,836,901
Patented June 3, 1958

2,836,901

METHOD FOR DRYING METAL SCRAP

Herbert William Davis, Compton, Calif., assignor to Link-Belt Company, a corporation of Illinois Application May 26, 1954, Serial No. 432,480

9 Claims. (Cl. 34—15)

This invention relates to a new and useful method of drying metal scrap, such as chips, filings, turnings, and the like, which are produced in machining operations, and deals more particularly with the removal of cutting oils and water from such metal scrap.

It has been a common practice in the past to process the metal scrap that results from machining operations for recovery of the cutting oils. Because the value of such metal scrap was formerly very low, little attention was given to the deteriorating effect the various oil recovery processes had on such scrap or to the preparation of the scrap for re-use. Recently, however, the value of such metal scrap has risen to an extent which makes it increasingly important to develop an economical process for removing the cutting oil and water from the scrap to prepare the latter for re-use. Of course, oxidation of the metal should be held to a minimum to provide a maximum recovery and to improve the quality of certain processed metals. Also, the combustible mixture that may be produced if the cutting oil vapors are permitted to mix with the proper amount of oxygen presents a difficult problem in the prevention of fires and explosions in such metal scrap recovery operations.

It is the primary object of this invention to provide a method for treating metal scrap to rapidly remove volatile wetting liquids therefrom by exposure of the wetted scrap to a hot drying medium in such a manner as to prevent excessive heating of the material and with the oxygen content of the drying medium accurately maintained at a value below that at which the ignition of the liquid vapors or substantial oxidation of the metal scrap can occur.

A further important object of the invention is to provide a method for uniformly drying metal scrap at an elevated temperature and in a manner which will assure the exclusion of free air from the drying medium so that the oxygen content of the drying medium can be accurately controlled to prevent excessive oxidation of the scrap and ignition of the liquid vapors.

A still further object of the invention is to provide a method for uniformly drying metal scrap to remove volatile wetting liquids therefrom by exposure of the scrap to a drying medium that has been heated by the combustion of a fuel in the presence of a sufficient quantity of air to assure efficient combustion, the quantity of air being accurately controlled to maintain the oxygen content in the drying medium at a value below that at which the liquid vapors can ignite.

Other objects and advantages of the invention will be apparent during the course of the following description.

Figure 2:
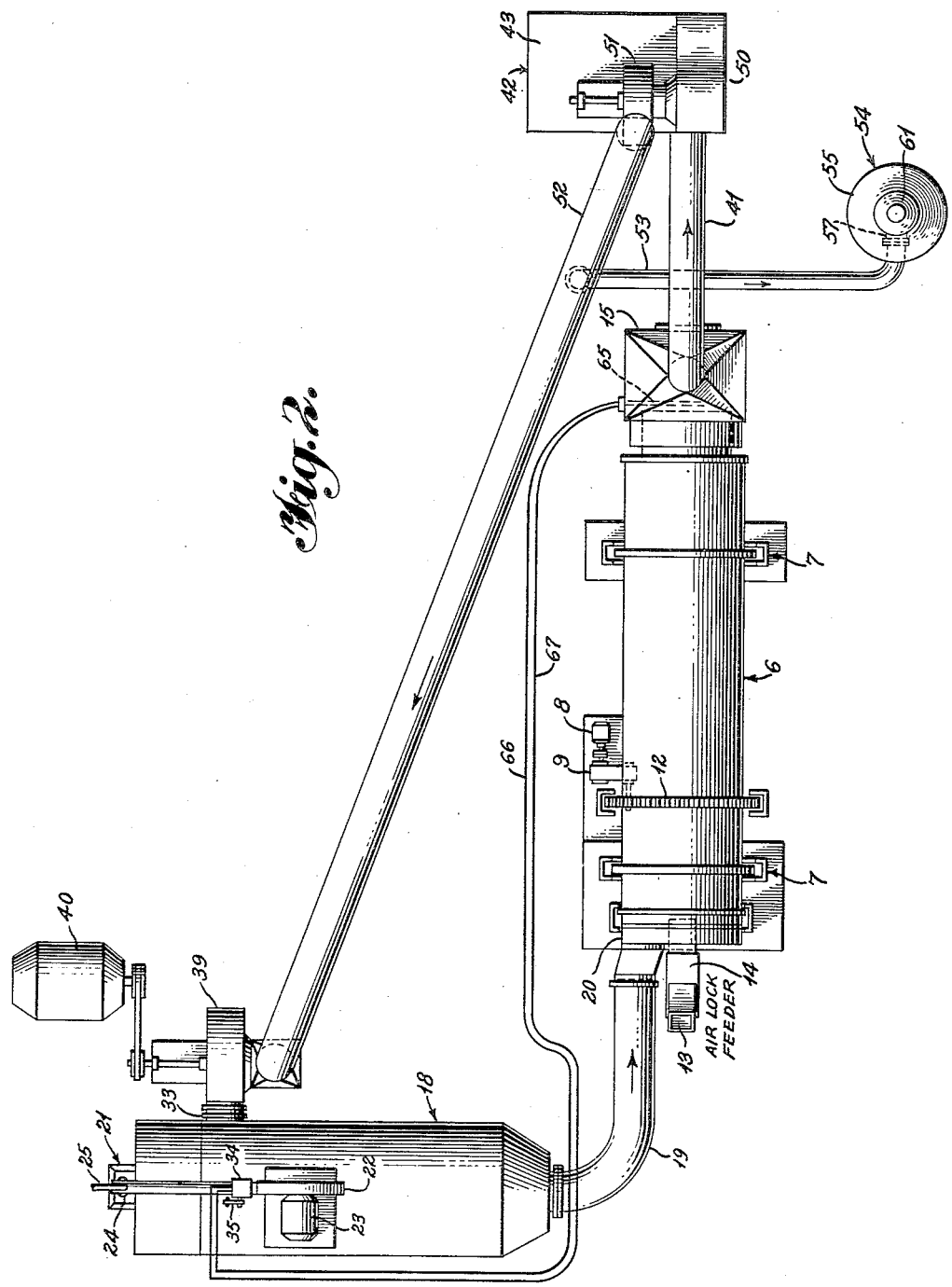
Figure 3:
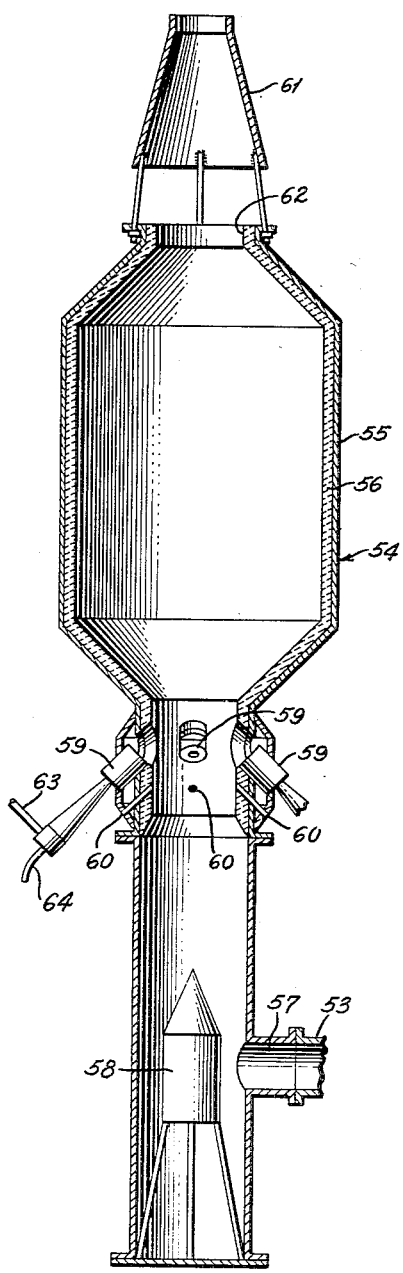
Figure 4:
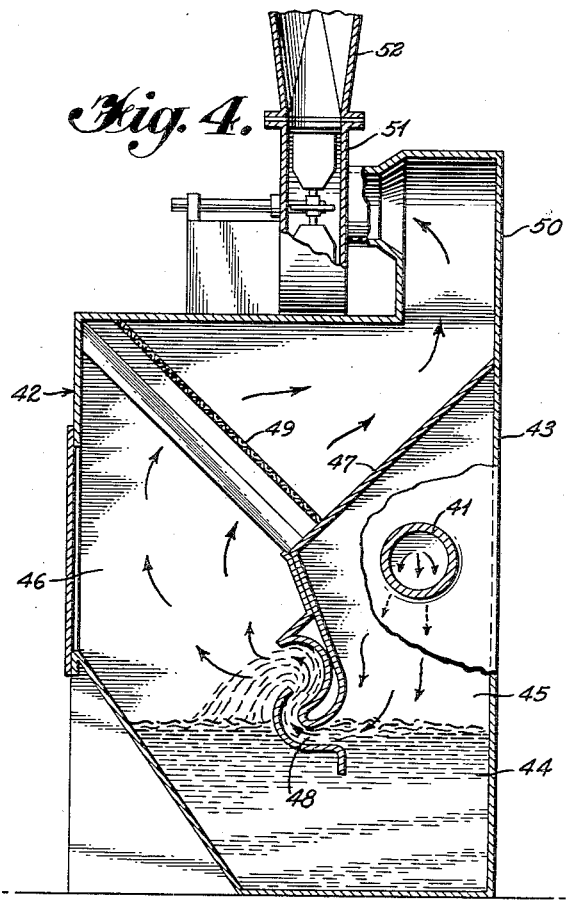
Figure 5:
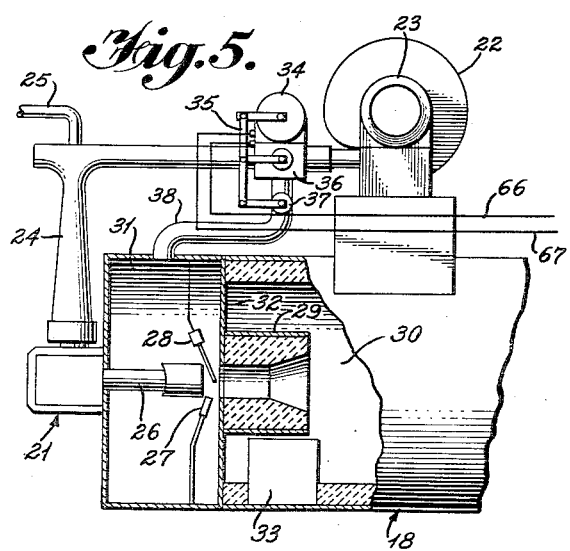

In the accompanying drawings forming a part of this specification and in which like reference characters are employed to designate like parts throughout the same, Figure 1 is a side elevational view of one form of treatment plant that has been developed to carry out the method of this invention, Figure 2 is a top plan view of the plant illustrated in Fig. 1, Figure 3 is a vertical sectional view of the smoke burner that forms a part of the plant equipment, Figure 4 is a vertical sectional view of a hydrostatic type dynamic precipitator illustrated in Figs. 1 and 2, and Figure 5 is a fragmentary elevational view showing the arrangement of the combustion blower with its motor and the burner with its control motor of the dryer portion of the plant.

In the drawings, wherein for the purpose of illustration is shown the preferred form of the apparatus for carrying out the invention, and first particularly referring to Figs. 1 and 2, the reference character 6 designates a horizontally arranged rotatable dryer of the type illustrated in the John L. Erisman patent, No. 2,522,025, dated September 12, 1950 for Rotary Dryer or Cooler. This dryer 6 has positioned within its outer cylindrical housing an internal material supporting shell formed of a plurality of tangentially arranged, longitudinally extending louvers between which the drying gases pass for delivery to the bottom of the bed of material advancing longitudinally through the dryer.

The dryer housing is supported for rotation about a horizontal axis by trunnions 7 and is driven by a motor 8 through a speed reducing unit 9 which drives the pinion gear 11 that is in engagement with the ring gear 12 extending around the dryer. The material to be dried is introduced into the dryer 6 through a feed chute 13 at one end of the dryer and the feed chute 13 is provided with a feeding device 14 of the type which provides an air lock across the feed chute. Material is discharged from the dryer 6 at the opposite end into the exhaust hood 15 where it drops downwardly through the discharge chute 16. The discharge chute 16 also includes an air lock 17 to prevent the escape of drying gases from the exhaust hood 15 as material is discharged through the discharge chute. Both the air lock feeder 14 and the air lock 17 in the discharge chute may take the form of a rotary gate feeder, or any other conventional device which will permit movement of material therethrough while preventing the escape of the drying gases.

The drying or treatment gases, which are a mixture of gaseous products of combustion and recycled off-gases, are fed into the dryer 6 between the outer shell of the dryer and the material supporting shell and beneath the bed of material in the dryer. The treatment gases flow into the dryer 6 from an oil or gas fired heater 18 through the duct 19 and the inlet manifold 20.

As best illustrated in Fig. 5, the heater 18 has mounted thereon a burner unit 21 which is provided with a combustion blower 22, driven by a motor 23, for supplying air under pressure to the mixing chamber 24. This air is mixed with gas or oil delivered through the pipe 25 and introduced as a combustible fuel into the burner unit 21. Within the heater 18, this fuel is discharged through the nozzle 26, past a pilot burner 27 and a thermostatic element 28 and through a tuyere 29 into the combustion chamber 30 of the burner unit. The pilot burner 27 serves to initially ignite the fuel discharged from the nozzle 26 and the thermostatic element 28 is connected in a conventional manner to prevent the discharge of fuel if for any reason the pilot burner flame is extinguished. The nozzle 26, pilot burner 27 and thermostatic element 28 are all positioned in a chamber 31 which is separated from the combustion chamber 30 by a partition 32. The chamber 31, however, is in communication with the combustion chamber 30 through the tuyere 29. The fuel discharged from the nozzle 26 through the tuyere 29 is ignited and burns within the combustion chamber 30 in direct heat exchange relation with the recycled off-gases which enter the combustion chamber through the duct 33, as will be later described.

The amount of fuel and air introduced through the burner unit 21 for combustion is controlled to properly adjust the temperatures of the gases entering the dryer 6 by regulating the flow of air into the mixing chamber 24 by means of a control motor 34 which is connected through a suitable linkage 35 to the flow regulators 36 and 37. The flow regulator 36 controls directly the amount of air flowing from the combustion blower 22 to the mixing chamber 24 and the flow regulator 37 is mounted in a branch duct 38 through which air may be introduced from the combustion blower to the chamber 31 of the burner unit 18. The linkage 35 connects the control motor 34 to the flow regulators 36 and 37 in such a manner that a reduction of flow through the flow regulator 36 will cause a sufficient flow of air through the flow regulator 37 and duct 38 to maintain a very slight pressure head in the chamber 31 to prevent back pressure from the combustion chamber 30 from extinguishing the flame at the nozzle 26 or pilot burner 27.

As illustrated in Figs. 1 and 2, the recycled off-gases entering the combustion chamber 30 of the heater 18 are forced through the duct 33 by an inlet fan 39 which is driven by a motor 40.

The off-gases flowing from the dryer 6, having passed through the bed of material advancing through the dryer and evaporated the cutting oil, or the like, with which the material was wetted, contain such oil in its vaporous state when they enter the exhaust hood 15. These off-gases are removed from the exhaust hood 15 through the stack 41 to a hydrostatic type precipitator unit 42. As illustrated in Fig. 4, this precipitator unit 42 is formed of a box-like casing 43 containing a body of water 44 in its bottom portion which may be maintained at the indicated level by any suitable means, not shown. The portion of the casing 43 located above the level of the water 44 is divided into an inlet chamber 45 and an exhaust chamber 46 by a partition 47. Joined to the lower edge of the partition 47 is a pasageway 48 which is S-shaped in vertical cross section and extends entirely across the precipitator casing 43. The bottom end of the passageway 48 is located below the level of the water 44 and communicates with the inlet chamber 45 while the top of the passageway 48 is located above the level of the water and opens into the exhaust chamber 46. A filter 49 extends across the exhaust chamber 46 above the top of the passageway 48 and an exhaust duct 50 connects the upper portion of the chamber 46 with the inlet side of a fan 51.

It will be readily apparent that when the fan 51 is operated to exhaust the chamber 46 of the unit 42, the off-gases from the dryer 6 will be drawn from the inlet chamber 45 through the water 44 and into the S-shaped passageway 48 at the bottom of the partition 47. During their passage through the water, some of the heavier fractions of the evaporated cuting oil, or the like, will be condensed and will settle out into the precipitator unit 42. Further, the hot off-gases will convert a certain amount of the water to steam which will be entrained by the off-gases and carried to the fan 51 and the duct 52 leading therefrom. This entrainment of steam by the off-gases serves to dilute, or reduce the percentage of oxygen in, the mixture of vaporized cutting oil and off-gases to be delivered to the heating unit 18. The duct 52, to which the mixture of off-gases and steam is delivered by the fan 51, is connected to the inlet side of the fan 39 for the heating unit 18.

Connected to the duct 52 is a bleed-off duct 53 which extends from the duct 52 to the smoke burner 54 so that a portion of the mixture of steam and off-gases will be released from the duct 52 for flow into the smoke burner.

As is best illustrated in Fig. 3, the smoke burner 54 is formed with the casing 55, the upper portion of which is enlarged and is lined with a refractory material 56.

The off-gases released from the duct 52 through the bleed-off duct 53 enter the smoke burner 54 through a side opening 57 near the bottom of the casing 55. Extending upwardly from the bottom of the casing 55 is a deflector shell 58 having a conical upper end portion with its apex extending toward the enlarged portion of the casing to deflect the off-gases from the opening 33 into the enlarged portion. At the base of the enlarged refractory lined portion of the casing 55 are one or more gas burner units 59 which are inclined angularly upwardly within the smoke burner 54 and are sealed in the casing 55. Immediately below each of the burners 59 is an opening 60 to provide admission of secondary air for the burners 59 and excess air which will be mixed with the portion of the off-gases that is released from the duct 52 to form a combustible mixture that will be ignited by the flame from the gas burners 59. At the discharge end of the enlarged portion of the casing 55, a frusto-conical cap 61 is arranged in axial alinement with and spaced from the top of the casing 55 so that air will be drawn into the stream of gases discharged to the atmosphere from the burner 54 to dilute any smoke that may be discharged from the burner and to thereby further avoid the possibility of creating a smoke nuisance.

Various types of fuels may be used in connection with the burners 59, including a mixture of combustible gas and air, the selected components of which enter the burners through pipelines 63 and 64. The combustible mixture that is ignited and burned in the enlarged portion of the smoke burner 54 will cause a rapid expansion of the gases in such enlarged portion and, since the discharge opening 62 is relatively small, a slight back pressure will be created within the burner 54 to prevent the free flow of gases through the bleed-off duct 53 from the duct 52. The smoke burner 54, therefore, provides for the release of a portion of the drying gases in the system under a very slight gauge pressure.

It will be appreciated that burner units of various types other than the type illustrated and described could be adapted to applicant's system and applicant does not wish to be limited to the exact shape and type of burner disclosed.

The mixture of off-gases and steam delivered to the heating unit 18 by the fan 39 is exposed to the flame of the burner unit 21 which effects substantially complete ignition of the lighter fractions of the cutting oil vapors that remain in the mixture. The hot treatment gases that are delivered to the inlet manifold 20 of the dryer 6, therefore, are substantially free of cutting oil vapors so that the cutting oils remaining on the material will be rapidly and efficiently evaporated and removed from the metal scrap. Further, the temperature of the treatment gases is maintained at a value which will enable the gases to evaporate the cutting oils without damage to the smaller sized particles of the metal scrap.

In addition to the control of the temperature of the drying gases, the burner unit 21 is adjusted to maintain the ratio of air to fuel in the mixing chamber 22 at a value at which sufficient oxygen is provided for the complete and efficient combustion of the fuel as well as the substantially complete combustion of the cutting oil vapors recirculated to the combustion chamber 30 of the heating unit 18. On the other hand, the oxygen content of the drying gases passing from the combustion chamber is maintained at a value below that which could support combustion of the evaporated cutting oil in the dryer 6. In other words, the ratio of air to fuel introduced into the combustion chamber 30 should be such that the oxygen remaining in the mixture of gases entering the dryer 6 after combustion of the fuel and the cutting oil vapor is less than ten percent. A reduction in the amount of oxygen passing through the dryer 6 to this value has been found to eliminate all possibility of fire or explosion in the dryer.

Considering now the operation of the above described apparatus in carrying out the method of the invention, the dryer 6 is started and the material to be dried is introduced through the feed chute 13 and the air lock feeder 14. This material consists of small metal scrap particles such as turnings, filings, chips and the like, that may be produced by various machining operations. When introduced into the dryer 6, the metal scrap is wet with the cutting oil used in machining operations which is usually an emulsion containing a certain amount of water. The material introduced into the dryer 6 forms a bed, the particles of which are gently rolled over upon themselves by the rotation of the dryer, and is advanced lengthwise through the dryer to the discharge hood 15 where it is delivered through the chute and air lock 17.

As the metal particles advance through the dryer 6, they are continuously subjected to the drying action of the hot treatment gases flowing from the heater 18 through the duct 19 and inlet manifold 20 into the dryer. The gases flow upwardly through the bed of metal particles throughout the length of the dryer so that the particles are uniformly exposed to the drying gases and will be uniformly dried as they progress through the dryer. The temperature of the drying gases is regulated by the burner control motor 34 which is controlled by thermostatic element 65 positioned in the exhaust hood 15 and connected by the control lines 66 and 67 to the motor 34, as illustrated in Figs. 2 and 5. Because the oxygen content and temperature of treatment gases are carefully controlled, oxidation of the metal particles in the dryer 6 is maintained at a minimum and the danger of fire or explosion of the cutting oil vapor of the drying gases is eliminated.

Since the particle size and characteristics of the metal scrap to be treated, the amount of oxidation of the treated scrap that will be permitted, and the amount and type of liquid with which the untreated scrap is wetted may vary greatly for each installation, the apparatus that is employed for carrying out the method must be capable of performing under a wide range of operating conditions. The required variations in operating conditions are provided by controlling the heat supplied to the material by the drying gases passing through the dryer 6 and by varying the rate of feed of the material through the inlet chute 13 and feeder 14.

Considering first the control of the heat supplied by the drying gases and the inherent limitations of the apparatus by which the method is carried out, it will be readily apparent that the heat supplied may be controlled by varying the temperature of the gases entering the dryer 6 at a given constant rate. The temperature, of course, must be exceeded the minimum value which will effect evaporation of the particular mixture of cutting oil and water carried by the metal scrap and must not approach too closely the temperature at which the scrap would be oxidized to an objectionable extent; that is, to an extent which would substantially reduce the value of the scrap for subsequent use.

The supply of heat may also be controlled by regulating the volume of the drying gases. In this connection, it will be noted that the dryer 6 itself controls the amount of drying gases flowing through the bed of metal scrap so that the volume of gas flowing through the bed is progressively reduced as the material is dried during its movement toward the discharge end of the dryer.

The maximum permissible temperature of the drying gases flowing through the dryer 6 at a given rate, therefore, will depend for the most part upon the type of metal scrap which is being treated. In other words, steel scrap may be subjected to temperatures much higher than aluminum or copper. As a further consideration in determining the maximum temperature to which the particles may be subjected, it will be noted that upon removal of the particles from the atmosphere of the dryer 6 through the discharge chute 16 and air lock 17, the oxidation of the metal in the presence of air will be accelerated as the discharge temperature of the metal is increased.

Further variation of the operating conditions quite obviously can be provided by changing the rate at which the wetted material is introduced to the dryer and the length of time the material is exposed to the drying gases.

Considering now the relationship of the two variables in operating conditions, it may be broadly stated that for any particular starting material that is wetted with varying percentages of cutting oil and water, the rate of flow of the material and the temperature of the drying gases may both be increased or decreased within the broad limitations discussed above so long as there is maintained such a relationship between the two as will effect the desired degree of drying of the material just prior to its discharge into the hopper 15.

It will be readily apparent that the above discussed limitations with respect to the variables in operating conditions are applicable to the process of the invention regardless of the type and condition of the material to be treated. In actual practice, however, it has been found that a reduction of the temperature of the drying gases substantially below 200° F. will require such a long retention period for the material as to render the process impractical, while a temperature that is substantially above 1200° F. will shorten the retention period to a mechanically impractical time interval. Further, at temperatures substantially above 1200° F. the oxidation of the material as it is discharged to the atmosphere is so excessive as to be objectionable. Ordinarily, therefore, the temperature of the drying gases will be maintained within a range of 200° F. to 1200° F.

Since the temperature of the drying gases and the rate of flow of material through the dryer 6 may be varied in a direct relationship while effecting the desired drying of the material just prior to its discharge from the dryer 6, the range of temperatures at which the drying gases are introduced into the material in the dryer 6 usually will be restricted to a more limited range. For most practical and economical operations a range of temperatures from 500° F. to 1000° F. is sufficient to provide satisfactory drying of the material despite wide variations in the type and amount of liquid with which the material is wetted. It will be understood, of course, that this range of temperatures must also be accompanied by a corresponding range in the rate of flow of the material through the dryer 6.

At the above discussed range of temperatures, it is very important that no air be permitted to leak into the closed system through which the drying gases are circulated. While the quantity of air mixed and introduced with the fuel at the burner unit 21 may be carefully controlled, the leakage of air into the system would nullify the effect of such control and would raise the oxygen content of the drying gases to a point at which the possibility of fire or explosion within the dryer 6 would create a very dangerous condition. In order to positively assure that no air will be permitted to leak into the closed system, the entire system is operated with the drying gases under a very slight gauge pressure of from zero to .25 inch of water.

It is to be understood that I do not desire to be limited to the exact order of method steps as they have been disclosed for variations and modifications of the same, which fall within the scope of the subjoined claims, are contemplated.

Having thus described the invention, I claim:

1. A method of removing cutting oil and the like from metal scrap that is wetted therewith, comprising flowing a stream of gases through a substantially enclosed path at a pressure above atmospheric pressure, passing the stream of gases through a zone in which a combustible mixture of fuel and air is burned to increase the temperature of the gases in said stream, passing the stream of heated gases through an agitated bed of metal scrap to evaporate the wetting liquid therefrom and entrain the resulting vapor in the flowing stream of off-gases, releasing off-gases from said stream at a rate which will maintain the pressure of the gases in said stream at a substantially constant value, recirculating the off-gases remaining in said stream to said zone in which the combustible mixture of fuel and air is burned, and regulating the quantity of air in said combustible mixture to a value which will permit substantially complete combustion of the fuel and the combustible vapors in said off-gases and which will prevent ignition of the combustible vapors entrained in any portion of said stream apart from said zone.

2. A method of removing cutting oil and the like from metal scrap that is wetted therewith, comprising flowing a stream of gases through a substantially enclosed path at a pressure above atmospheric pressure, passing the stream of gases through a zone in which a combustible mixture of fuel and air is burned to increase the temperature of gases in said stream, passing the stream of heated gases through an agitated bed of metal scrap to evaporate the wetting liquid therefrom and entrain the resulting vapor into the flowing stream of off-gases, releasing a portion of the off-gases from said stream, mixing air with said released off-gases in the presence of an open flame to effect combustion and expansion of the mixture, releasing said expanded mixture to the atmosphere at a rate that will maintain a back pressure on said stream to prevent a loss of pressure from the stream, recirculating the off-gases remaining in said stream to said zone in which the combustible mixture of fuel and air is burned, and regulating the quantity of air in said combustible mixture to a value which will permit substantially complete combustion of the fuel and the combustible vapors in said off-gases and which will prevent ignition of the combustible vapors entrained in any portion of said stream apart from said zone.

3. A method of removing cutting oil and the like from metal scrap that is wetted therewith, comprising flowing a stream of gases through a substantially enclosed path at a pressure above atmospheric pressure, passing the stream of gases through a zone in which a combustible mixture of fuel and air is burned to increase the temperature of the gases in said stream, passing the stream of heated gases through an agitated bed of metal scrap to evaporate the wetting liquid therefrom and entrain the resulting vapor in the flowing stream of off-gases, passing the hot off-gases in said stream through a water bath for evaporating a portion of the water and entraining the water vapor in said stream to dilute the oxygen content of the stream, releasing the resulting mixture of off-gases and water vapor from said stream at a rate which will maintain the pressure of the gases in said stream at a substantially constant value, recirculating the off-gases remaining in said stream to said zone in which the combustible mixture of fuel and air is burned, and regulating the quantity of air in said combustible mixture to a value which will permit substantially complete combustion of the fuel and the combustible vapors in said off-gases and which will prevent ignition of the combustible vapors entrained in any portion of said stream apart from said zone.

4. A method of removing cutting oil and the like from metal scrap that is wetted therewith, comprising flowing a stream of gases through a substantially enclosed path at a pressure above atmospheric pressure passing the stream of gases through a zone in which a combustible mixture of fuel and air is burned to increase the temperature of the gases in said stream to a predetermined maximum value, passing the stream of heated gases through an agitated bed of metal scrap to evaporate the wetting liquid therefrom and entrain the resulting vapor in the flowing stream of off-gases, said predetermined maximum temperature having a value at which the temperature of the material in said bed is maintained below that at which the smallest size particles in said bed would be objectionably oxidized during their movement in contact with said stream, releasing the off-gases from said stream at a rate which will maintain the pressure of the gases in said stream at a substantially constant value, recirculating the off-gases remaining in said stream to said zone in which the combustible mixture of fuel and air is burned, and regulating the quantity of air in said combustible mixture to a value which will permit substantially complete combustion of the fuel and combustible vapors in said off-gases and which will prevent ignition of the combustible vapors entrained in any portion of said stream apart from said zone.

5. A method of removing cutting oil and the like from metal scrap that is wetted therewith, comprising flowing a stream of gases through a substantially enclosed path at a pressure above atmospheric pressure, passing the stream of gases through a zone in which a combustible mixture of fuel and air is burned to increase the temperature of the gases in said stream to a predetermined maximum value, passing the stream of heated gases through an agitated bed of metal scrap to evaporate the wetting liquid therefrom and entrain the resulting vapor in the flowing stream of off-gases, removing the metal scrap from said bed immediately after the wetting liquid is evaporated therefrom to prevent excessive heating of the scrap, said predetermined maximum temperature having a value at which the temperature of the material in said bed is maintained below that at which the smallest size particles in said bed would be objectionably oxidized during their movement in contact with said stream, releasing a portion of the off-gases from said stream, mixing air with said released off-gases in the presence of an open flame to effect combustion and expansion of the mixture, releasing said expanded mixture to the atmosphere at a rate that will maintain a back pressure on said stream to prevent a loss of pressure from the stream, recirculating the off-gases remaining in said stream to said zone in which the combustible mixture of fuel and air is burned, and regulating the quantity of air in said combustible mixture to a value which will permit substantially complete combustion of the fuel and the combustible vapors in said off-gases and which will prevent ignition of the combustible vapors entrained in any portion of said stream apart from said zone.

6. A method of removing cutting oil and the like from metal scrap that is wetted therewith, comprising flowing a stream of gases through a substantially enclosed and continuous path at a pressure above atmospheric pressure, passing the stream of gases through a zone in which a variable amount of combustible mixture of fuel and air is burned to increase the temperature of the gases in said stream, passing the stream of heated gases through an agitated bed of metal scrap for a given period of time, controlling the amount of said mixture that is burned in said zone in response to changes in the temperature of the off-gases from said bed to maintain the temperature of the gases entering the bed at a value at which the metal scrap is substantially completely dried during said given period of time and the resulting vapor is entrained in the flowing stream of off-gases, releasing the off-gases from said stream at a rate which will maintain the pressure of the gases in said stream at a substantially constant value, and regulating the quantity of air in said combustible mixture to a value which will permit substantially complete combustion of the fuel and the combustible vapors in said off-gases and which will prevent ignition of the combustible vapors entrained in any portion of said stream apart from said zone.

7. A method of removing cutting oil and the like from metal scrap that is wetted therewith, comprising flowing a stream of gases through a substantially enclosed and continuous path at a pressure above atmospheric pressure, passing the stream of gases through a zone in which a variable amount of a combustible mixture of fuel and air is burned to increase the temperature of the gases in said stream, passing the stream of heated gases through an agitated bed of metal scrap for a given period of time, controlling the amount of said combustible mixture that is burned at said zone in response to changes in the temperature of the off-gases from said bed to maintain the temperature of the gases in the bed at a value at which the metal scrap is substantially completely dried during said given period of time and the resulting vapor is entrained in the flowing stream of off-gases, adding water vapor to the off-gases in said stream, releasing the resulting mixture of off-gases and water vapor from said stream at a rate which will maintain the pressure of the off-gases in the stream at a substantially constant value, and regulating the quantity of air in said combustible mixture to a value which will permit substantially complete combustion of said fuel and said combustible vapors in said off-gases and which will prevent ignition of the combustible vapors entrained in any portion of said stream apart from said zone.

8. A method of removing cutting oil and the like from metal scrap that is wetted therewith, comprising flowing a stream of gases through a substantially enclosed path at a pressure above atmospheric pressure, passing the stream of gases through a zone in which a variable amount of a combustible mixture of fuel and air is burned to increase the temperature of the gases in said stream to a predetermined value, passing the stream of heated gases through an agitated bed of metal scrap for a given period of time, the predetermined temperature of the drying gases being above approximately 200° F. and below a temperature at which the smallest size particles in said bed would be objectionably oxidized during said given period of time and being such that the metal scrap is dried during said given period of time and the resulting vapor is entrained in the flowing stream of off-gases, releasing the off-gases from said stream at a rate which will maintai nthe pressure of the gases in said stream at a substantially constant value, and regulating the quantity of air in said combustible mixture to a value which will permit substantially complete combustion of said fuel and the combustible vapors in said off-gases and which will prevent ignition of the combustible vapors entrained in any portion of the stream apart from said zone.

9. A method of removing cutting oil and the like from metal scrap that is wetted therewith, comprising flowing a stream of gases through a substantially enclosed path at a pressure above atmospheric pressure passing the stream of gases through a zone in which a combustible mixture of fuel and air is burned to increase the temperature of the gases in said stream, passing the stream of heated gases through a bed of metal scrap that is wetted with a varying percent by weight of volatile liquids at least a portion of which are combustible in an ambient temperature, maintaining a relationship between the period of time during which the gases flow through the bed and the temperature of the gases entering the bed which will effect complete evaporation of the volatile liquids with the temperature of the drying gases being below that at which the smallest sized particles in the bed would be objectionably oxidized during said period, releasing the off-gases from said stream at a rate which will maintain the pressure of the gases in said stream at a substantially constant value, recirculating the off-gases remaining in said stream to said zone in which the combustible mixture of fuel and air is burned, and regulating the quantity of air in said combustible mixture to a value which will permit substantially complete combustion of the fuel and the combustible vapors in said off-gases and which will will prevent ignition of the combustible vapors entrained in any portion of said stream apart from said zone.

References Cited in the file of this patent

UNITED STATES PATENTS

| | | |
|---|---|---|
| 1,362,213 | Andrews | Dec. 14, 1920 |
| 1,557,880 | Richter | Oct. 20, 1925 |
| 1,738,641 | Cowan | Dec. 10, 1929 |
| 1,791,561 | Heyn et al. | Feb. 10, 1931 |
| 1,999,513 | Morrison | Apr. 30, 1935 |
| 2,119,261 | Andrews | May 31, 1938 |
| 2,152,154 | Robiette | Mar. 28, 1939 |
| 2,177,258 | Jares | Oct. 24, 1939 |
| 2,489,116 | Young | Nov. 22, 1949 |
| 2,525,535 | Erisman et al. | Oct. 10, 1950 |
| 2,720,710 | Erisman | Oct. 18, 1955 |
| 2,750,680 | Houdry et al. | June 19, 1956 |